United States Patent [19]

Ishii et al.

[11] Patent Number: 5,047,850
[45] Date of Patent: Sep. 10, 1991

[54] DETECTOR FOR DETECTING VECTOR INDICATING MOTION OF IMAGE

[75] Inventors: Hirofumi Ishii, Moriguchi; Atsushi Morima, Nara, both of Japan

[73] Assignee: Matsushita Electric Industrial Co., Ltd., Osaka, Japan

[21] Appl. No.: 486,912

[22] Filed: Mar. 1, 1990

[30] Foreign Application Priority Data

Mar. 3, 1989 [JP] Japan .................................. 1-052286
Mar. 14, 1989 [JP] Japan .................................. 1-061780

[51] Int. Cl.$^5$ .......................... H04N 7/18; H04N 7/12
[52] U.S. Cl. ..................................... 358/105; 358/136
[58] Field of Search .............................. 358/105, 136

[56] References Cited

U.S. PATENT DOCUMENTS

| 4,651,206 | 3/1987 | Ohki | 358/105 |
| 4,689,672 | 8/1987 | Furukawa | 358/105 |
| 4,924,310 | 5/1990 | Von Brandt | 358/105 |
| 4,947,248 | 8/1990 | Hienerwadel | 358/105 |

FOREIGN PATENT DOCUMENTS 62-25590 2/1987 Japan .

OTHER PUBLICATIONS

A New Technique to Improve Video Stability by Digital Processing, Toshimari Matsuzuru, 11/88 SMPTE Journal.

Primary Examiner—James J. Groody
Assistant Examiner—Sherrie Hsia
Attorney, Agent, or Firm—Stevens, Davis, Miller & Mosher

[57] ABSTRACT

A detector for detecting a motion vector indicating the motion of an image comprising: device for deriving corrlative values for an overall or partial screen area for the two-field image signal of a successively inputted TV signal, within an area of motion vectors to be predicted for the current field, based on the motion vectors obtained before the current field; and device for deriving, as a motion vector, an optimum value from among the correlative values, whereby the correlative values in the area of motion vectors to be predicted for the current field are derived on the basis of the motion vectors obtained before the current field, and then a motion vector is detected from among those correlative values. With the above structure, it is made possible to detect a motion vector in a larger area with a smaller amount of operation, circuit and processing time, as compared with a prior art detector.

14 Claims, 8 Drawing Sheets

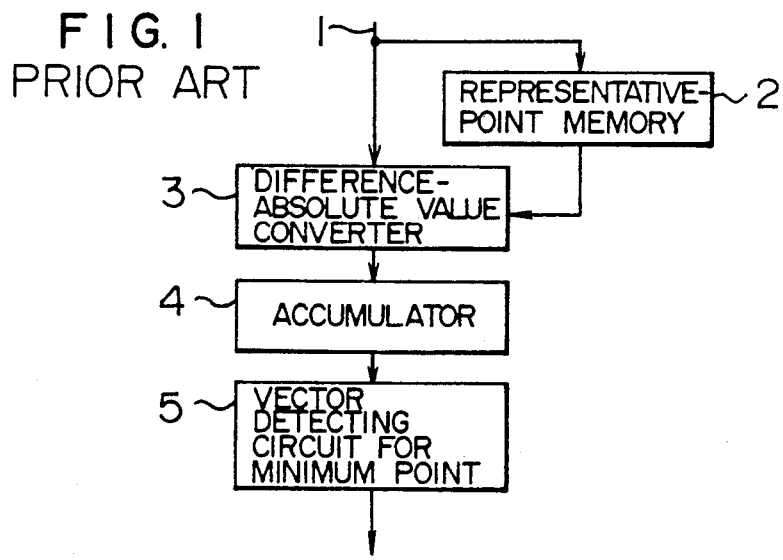
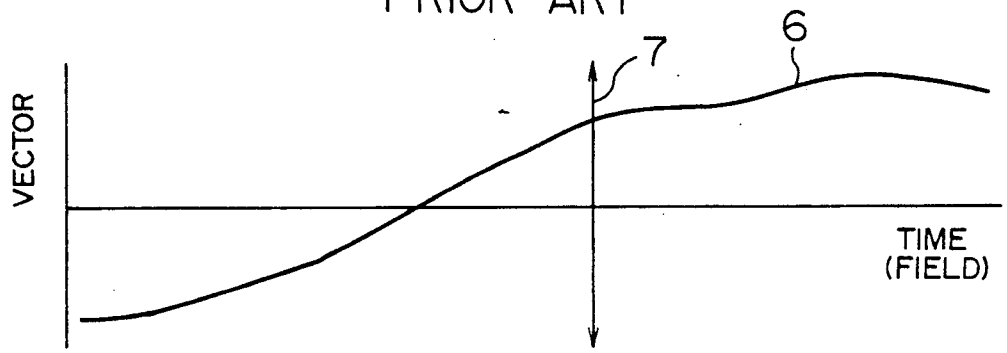
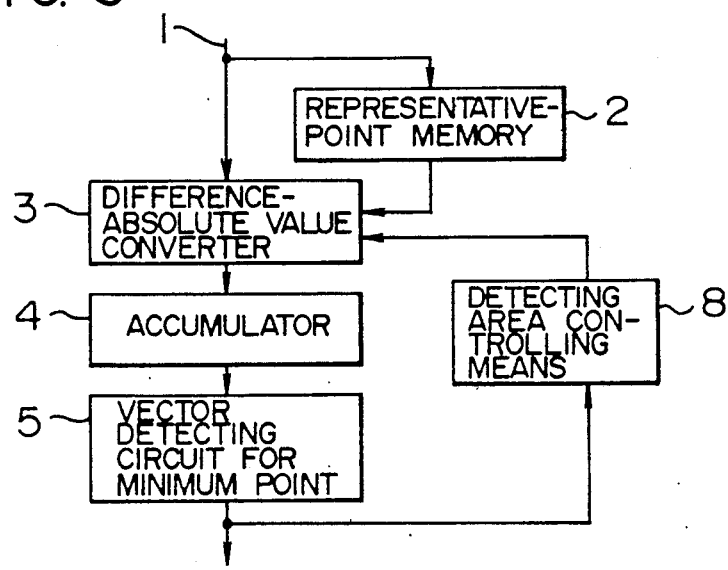

DETECTOR FOR DETECTING VECTOR INDICATING MOTION OF IMAGE

BACKGROUND OF THE INVENTION

1. Field of the Invention

The present invention relates to a detector for detecting a vector indicating the motion of an image (hereinafter referred to as an image-motion vector or a motion vector).

2. Description Related Art

A typical prior art of the detector has been proposed in the Official Gazette of JP-A-62-25590.

FIG. 1 is a block diagram showing this prior art. As shown, 1 denotes an input terminal for an image signal, 2 denotes a memory for storing representative points, which stores signals for pixels corresponding to the representative points in an input image signal, 3 denotes a difference-absolute value converter, which outputs absolute values of differences between the input signals, 4 denotes an accumulator, and 5 denotes a detecting circuit for a minimum point.

According to the prior art detector including the foregoing components, at first, continuous image signals of two fields or more are received at the input terminal 1. In the representative-point memory 2, two or more representative points are preset in a detecting region on a screen. The memory 2 stores a signal for a pixel positioned on each of the representative points in the input image signal. The difference-absolute value converter 3 operates to determine each difference between the value of a signal of a representative point of the previous field and that of a shifted point shifted by i horizontally and j vertically from a representative point of the current field and to derive an absolute value $|\Delta L|$ (i, j) of the difference, where i denotes a horizontal distance and j denotes a vertical distance. The accumulator 4 contains a table for the displacement (i, j) within a detecting area, in which table the signals sent from the difference-absolute value converter 3 are accumulatively added for each point of the displacement (i, j). The accumulator 4 sends out a resultant value as a correlative value $\tau|\Delta L|$ (i, j) for the displacement (i, j). The minimum-point detecting circuit 5 detects the displacement (i', j') which provides a minimum value in the correlative values and assumes it as a motion vector.

The aforementioned description has been directed to the representative-point matching system. Besides this system an, all-point matching system is also known. In place of storing only the signals of the pixels positioned at the representative points, this system stores signals of all the pixels on the detecting area. Then, like the foregoing system, it performs the steps of deriving an absolute value of a difference (i, j) between the previous field signal and a signal shifted by (i, j) from the current field signal, accumulatively adding the absolute values, and assuming, as a motion vector, a displacement (i', j') which provides a minimum value of these values.

The above-mentioned arrangement, however, derives only correlative values for a displacement within a defined area Hence, it has a shortcoming that no motion vector outside the defined area can be detected.

If a user quickly moves a video camera when he pans the camera or shakes his hands while holding the camera, for example, no motion vector can be detected.

For detecting a motion vector having such a large amplitude, it is necessary to derive correlative values within a very large area For example, as shown in FIG. 2, a large detecting area 7 is required for detecting a motion vector 6 having such a large amplitude. Thus, it gives rise to a shortcoming that the processing time becomes long and the circuit becomes complicated.

To overcome the above-mentioned shortcomings, it is, therefore, an object of the invention to provide an image-motion vector detector capable of detecting a motion vector within a detecting region broader than that of a conventional detector and also capable of greatly reducing the processing time and the scale of an electronic circuit involved.

SUMMARY OF THE INVENTION

The present invention comprises means for deriving correlative values in the range of predictable motion vectors of the current field from the motion vectors of the fields before the current field, in the whole or a part of image screen representing an image signal of two fields in a continuously received TV signal, and means for deriving an optimum point from among the correlative values and assuming it as a motion vector.

With the foregoing configuration, the invention makes it possible to derive correlative values in the range of predictable motion vectors of the current field from the motion vectors of the fields before the current field and detecting an optimum motion vector by using the correlative values. Especially, as to a motion having a large low-frequency amplitude, a motion vector in a range broader than that of the prior art can be detected with a smaller amount of processing operation, circuit elements and processing time.

BRIEF DESCRIPTION OF THE DRAWINGS

FIG. 1 is a block diagram showing a conventional detector for detecting an image-motion vector;

FIG. 2 is a graph indicating the relation between an area in which a motion vector is detected and an image-motion vector in the prior art;

FIG. 3 is a block diagram showing a detector for detecting an image-motion vector of a first embodiment of the invention;

DESCRIPTION OF THE PREFERRED EMBODIMENTS

Figure 4:
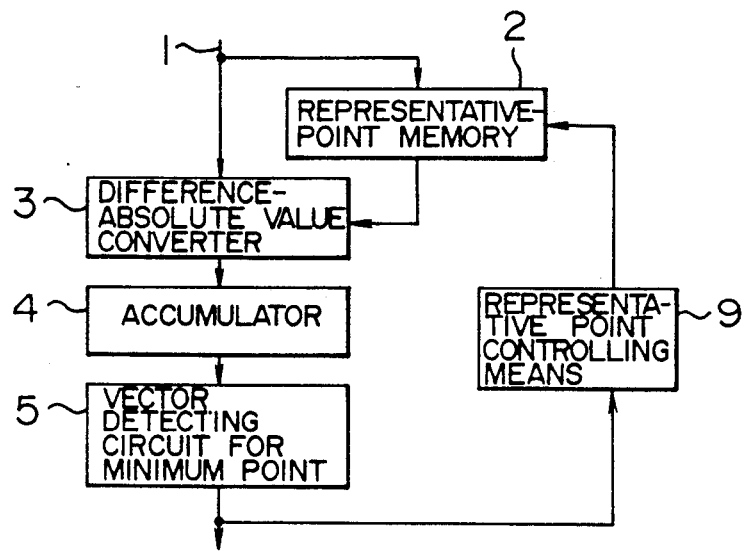
FIG. 4 is a block diagram showing a detector for detecting an image-motion vector of a second embodiment of the invention.

FIG. 3 is a block diagram showing a detector for detecting an image-motion vector according to a first embodiment of the invention. The common elements to those of the prior art shown in FIG. 1 are referenced by common numbers. In FIG. 3, 1 denotes an input terminal for an image signal. 2 denotes a representative-point memory, which operates to store signals for the pixels positioned on the representative points in the input image signal. 3 denotes a differential absolute value converter, which operates to send an absolute value of a difference between the input signals. 4 denotes an accumulator, and 5 denotes a detecting circuit for minimum points. 8 denotes means for controlling a detecting area.

Next, a description will be directed to the function of a detector for an image-motion vector according to the present embodiment. At first, an image signal is timeserially inputted to the input terminal 1. For the representative-point memory 2, more than one representative point is preset in a detecting area on a screen. The memory 2 stores a signal for each pixel positioned on the representative points in the received image signal When a field $(n-1)$ is inputted, a motion vector $(X(n-1), Y(n-1))$ of the previous field $(n-1)$ is detected. Then, the vector value is inputted to the means for controlling a detecting area.

When a signal for the next field (n) is inputted, the difference-absolute value converter 3 serves to derive an absolute value $|\Delta L|$ (i, j) of a difference between a signal for each position of the representative points of the previous field and a signal for each position displaced from the representative points of the current field by horizontally $i+X(n-1)$ and vertically $j+Y(n-1)$, by being controlled by the means 8 for controlling a detecting area. The range of i and j is substantially centered at zero point $(-hi/2 < i \leq hi/2, -hj/2 < j \leq hj/2)$. The accumulator 4 contains a table for the displacement (i, j), in which table the signal sent from the difference-absolute value converter 3 is accumulatively added in each element of the displacement (i, j). The resultant value is assumed as a correlative value $\Sigma|\Delta L|$ (i, j) of the displacement (i, j). The minimum-point detecting circuit 5 detects the displacement (i', j') providing the minimum value of the correlative values and calculates an addition of the detected displacement (i', j') and the detected vector $(X(n-1), Y(n-1))$ to give a motion vector $(X(n), Y(n))$ of the current field with respect to the previous field.

Even in such a case that a user swings a video camera greatly, in one direction by panning, or by hand vibration with a low-frequency, a change of a motion vector between fields is far smaller than an amplitude of the motion vector. Even if the area (hi, hj) for deriving correlative values is defined to be small, it is possible to detect the motion vector having a larger amplitude than that of the prior art.

Figure 5:
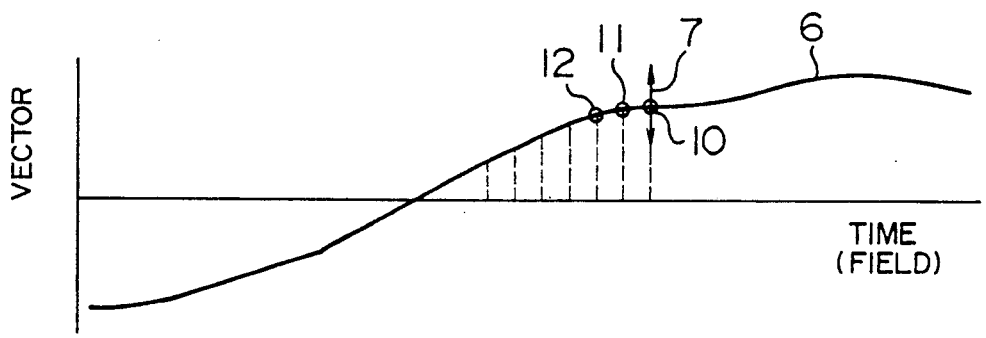
FIG. 5 is a graph indicating the relation between an area in which a motion vector is detected and an image-motion vector in the embodiments of the invention.

Even in the case of detecting a motion vector 6 having a large amplitude as shown in FIG. 5, for example, the motion vector 10 of the current field is correlated to some degree with the motion vector 11 of the previous field, so that no larger area is required for a detecting area 7 as compared with that of the prior art.

This embodiment is designed to fix the representative points and shift the area to be correlated with these representative points. This is superior to a reverse type of design of shifting representative points in that data of the detected vector $(X(n-1), Y(n-1))$ of the previous field can be used for detecting the motion vector $(X(n), Y(n))$ of the current field In the reverse type of design, the vector $(X(n-1), Y(n-1))$ of the previous field has not been detected at the time of sampling the representative points, that is, at the time of receiving a signal for the previous field Hence, it is necessary to use the detected vector $(X(n-2), Y(n-2))$ of two fields before, namely, that of the field before the previous field. The present embodiment can employ the detected vector $(X(n-1), Y(n-1))$ of the previous field. A difference in the motion vector between the current field and the previous field is assumed to be about half as much as a difference in the motion vector between the current field and the field before the previous field, thereby making the area (hi, hj) for deriving correlative values smaller accordingly.

Further, the detected vector $(X(n-1), Y(n-1))$ of the previous field is taken as a center of the detecting area. This gives an advantage that the detecting area may be shifted in the vector direction. For example, by using a coefficient a, $(a \times X(n-1), a \times Y(n-1))$ may be defined as the center.

This embodiment may employ a detected vector of a field before the previous field. For example, when using the detected vector $(X(n-2), Y(n-2))$ of two fields before, $(2 \times a \times X(n-1) - b \times X(n-2), 2 \times a \times Y(n-1) + b \times Y(n-2))$ may be defined as the center (a and b denote coefficients).

The detected vector may be clipped so as not to make the shift of the center exceed a constant value.

The means 8 for controlling a detecting area can be realized with hardware using an actual circuit or with software using a microcomputer.

FIG. 4 is a block diagram showing a detector for detecting an image-motion vector according to a second embodiment of the invention. The elements common to those shown in FIG. 3 are referenced by the same numbers. In FIG. 4, 9 denotes a circuit for controlling representative points.

Then, a description will be directed to the function of the detector for an image-motion vector according to the present embodiment. An image signal continuing with time is inputted to the input terminal 1.

At a time of inputting an image signal of a field $(n-1)$, the circuit 9 for controlling the representative points has received a detected vector $(X(n-2), Y(n-2))$ of the field before the input field. The representative-point controlling circuit 9 assumes as its representative points the points shifted from the reference points predefined in the detecting area on a screen by a reverse vector $(-X(n-2), -Y(n-2))$ of the detected vector and serves to control a representative-point memory. The memory stores a signal for each pixel positioned on the representative points in the input image signal. When the signal for the next field (n) is inputted, the difference-absolute value converter 3 serves to derive an absolute value $|\Delta L|$ (i, j) of a difference between the values stored in the memory and the signals for positions shifted from the reference points of the representative points by a horizontal value i and a vertical value j. It is assumed that the area of i and j is centered at zero vector $(-hi/2 < i \leq hi/2, -hj/2 < j \leq hj/2)$. The accumulator 4 contains a table for the displacement (i, j) and accumulatively adds the signal sent from the difference-absolute value converter 3 in each displacement (i, j). The resultant values are assumed as correlative values $\Sigma|\Delta L|(i, j)$ in the displacement (i, j). The minimum-point detecting circuit 5 serves to detect the displacement (i', j') giving a minimum value of the correlative values and calculate an addition of the minimum value and the detected vector (X(n−2), Y(n−2)) of two fields before as a motion vector (X(n), Y(n)) of the current field with respect to the previous field.

According to the present embodiment, when a user swings a video camera in one direction in panning or swings it greatly at a low frequency by hand vibration, the change of a motion vector between fields is made far smaller than the amplitude of the motion vector. Hence, if the area (hi, hj) for deriving correlative values is made smaller, this embodiment can detect a motion vector having a larger amplitude than that of the prior art.

This embodiment is designed to shift the positions of the representative points and to define an area for deriving correlative values of the representative points. This is superior to the first embodiment in that it can be more easily realized.

Herein, the representative points are shifted only by a reverse vector of the detected vector (X(n−2), Y(n−2)) of two fields before. The detecting area may be shifted in the vector direction. For example, it may be centered by $(a \times X(n-2), b \times Y(n-2))$ by using coefficients a and b.

It may employ a detected vector of the field before two fields before For example, by using a detected vector (X(n−3), Y(n−3)) of the field before two fields before, the center of the detecting area may be $(2 \times a \times X(n-2) - b \times X(n-3), 2 \times a \times Y(n-2) + b \times Y(n-3))$ (a and b denote coefficients). The detected vector may be clipped so as not to make the shift of the center exceed a constant value.

The representative-point control means 9 can be realized with hardware employing an actual circuit or with software run in a microcomputer. And, the first and second embodiments assume the minimum value of the correlative values in one detecting area as a motion vector. Without being limited to them, naturally, the invention may be applied to the case wherein one image-motion vector can be derived by detecting the values in more than one detecting area on a screen and determining the reliability of these values Next, a description will be directed to the concrete embodiment of the predicting means.

Figure 6:
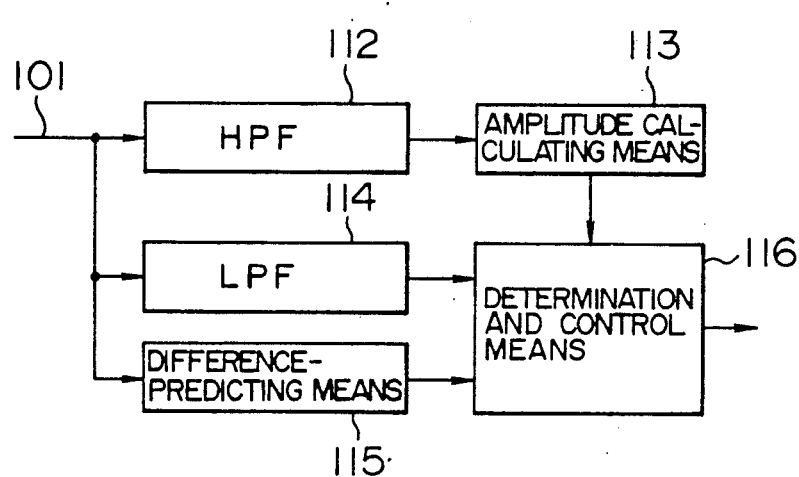
FIG. 6 is a block diagram showing a motion vector predicting device employed in the invention.

FIG. 6 is a block diagram showing means for predicting a motion vector employed in the present invention. In FIG. 6, 101 denotes an input terminal for a vector 112 denotes a high-pass filter, 113 denotes means for calculating an amplitude, 114 denotes a low-pass filter, 115 denotes means for predicting a difference, and 116 denotes means for performing determination and control.

Then, the function of the means for predicting an image-motion vector will be described. A motion vector detected for each field is inputted to the input terminal 101. The high-pass filter 12 serves to extract a high-frequency component from the field frequency of the motion vector. The high-frequency component contains about a quarter or more of the field frequency. The amplitude-calculating means 113 serves to calculate a magnitude of the high-frequency component for a fixed period and to send the result to the determination and control means 116. The low-pass filter 114 serves to suppress a high-frequency component of a field frequency of the motion vector inputted for each field. The high-frequency component contains about a quarter or more of the field frequency. The difference-predicting means 115 serves to calculate a predicted vector $2 \times a \times X(n-1) - b \times X(n-2), 2 \times a \times Y(n-1) + b \times Y(n-2))$ (a and b denote coefficients) by using the latest vector (X(n−1), Y(n−1)) and the vector before it (X(n−2), Y(n−2)) inputted for each field. The determination and control means 116 serves to determine a magnitude of the quarter or more high-frequency component of the field frequency of the motion vector inputted for each field, and, if the high-frequency component is larger than a predetermined amount, to output the vector sent from the low-pass filter 114 as a predicted motion vector, and, if it is smaller than the predetermined amount, to output the vector sent from the difference-predicting means 115 as a predicted motion vector.

Figure 7A:
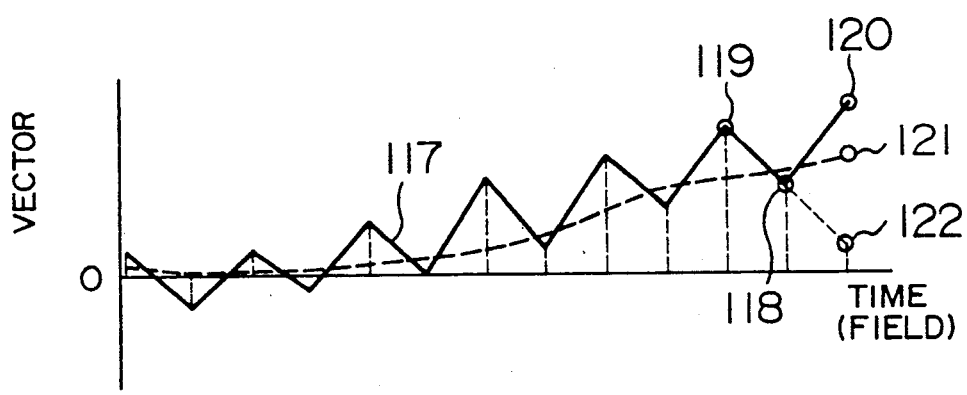
FIGS. 7a, 7b, and 8a, 8b, are graphs indicating the relation between a predicted motion vector and an image-motion vector.
Figure 7B:
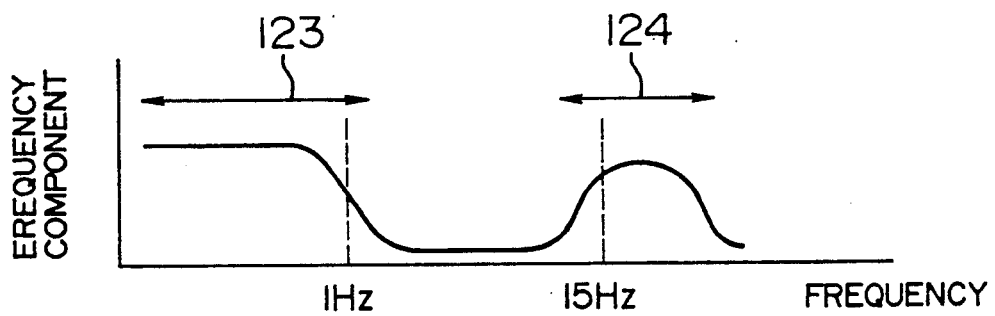

FIG. 7a shows a vector indicating the motion of an image taken in a car seriously vibrating, that is, vibrating with a high-frequency. FIG. 7b shows a frequency component of the image-motion vector shown in FIG. 7a. As shown, 117 denotes a motion vector changing with time, 118 denotes a detected vector of the previous field, 119 denotes a detected vector of two fields before, 120 denotes a motion vector of the current field, 121 denotes the motion vector filtered by the low-pass filter 114, 122 denotes an output for the current field sent from the difference-predicting means 115, 123 denotes a low-frequency component of the motion vector 117 given, for example, when panning a video camera, 124 denotes a high-frequency component of the motion vector 117 given by a vibrating video camera.

As shown in FIG. 7b, the motion vector 117 mainly contains a frequency component 123 of 1 Hz or less given by panning a video camera, for example, and a high-frequency component 124 given by a vibrating video camera If the field frequency contains a high-frequency component, which is more than the low-frequency component and occupies about a quarter or more of the field frequency, the smoothed high-frequency component should be assumed as a predicted vector, because it has a smaller average error for the motion vector 120 of the current field than the vector 122 predicted from the detected vector 118 of the previous field and the detected vector 119 of two fields before.

Figure 8A:
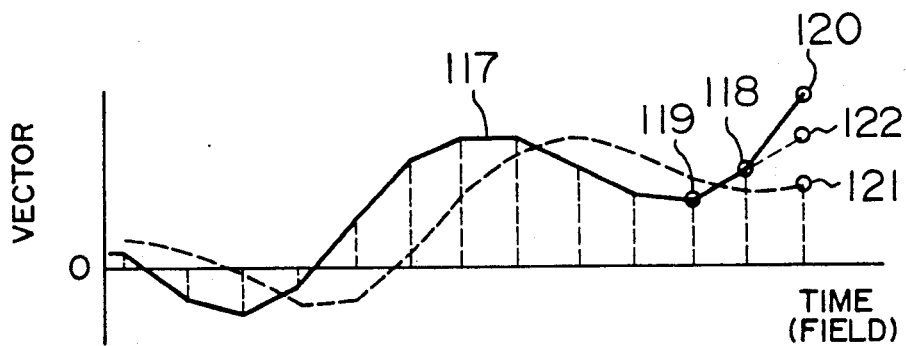
Figure 8B:
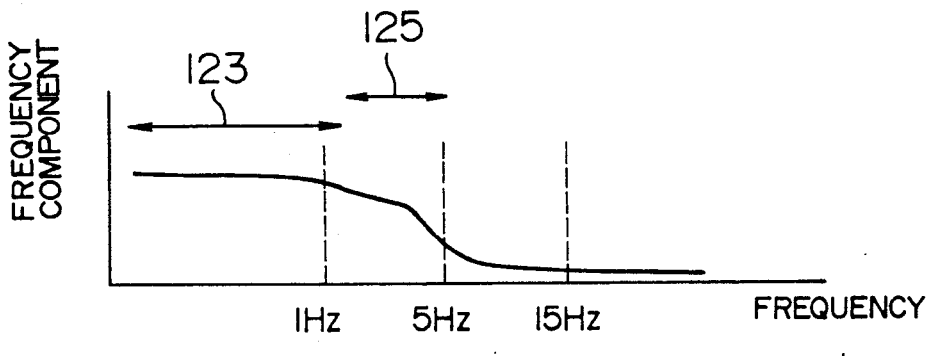

FIG. 8a shows a vector indicating the motion of an image taken when a user holds a video camera with his hands. FIG. 8b shows frequency components of the motion vector. As shown, 117 denotes a motion vector changing with time, 118 denotes a detected vector of the previous field, 119 denotes a detected vector of two fields before, 120 denotes a motion vector of the current field, 121 denotes the motion vector 117 filtered by the low-pass filter 114, 122 denotes an output of the current field sent from the difference-predicting means 115, 123 denotes a low-frequency component of the motion vector 117 given by panning a video camera, for example, and 125 denotes a high frequency component of the motion vector 117 given by vibrating hand with which a video camera is held.

As shown in FIG. 8b, a human body absorbs the high-frequency vibration, but since the video camera is held with hands, hand vibration causes mainly a frequency component 125 of 1 Hz to 5 Hz to be generated.

In this case, as shown in FIG. 8a, the low-pass filter 114 outputs a delayed signal 121. Hence, it is preferable to employ, as a predicted motion vector, the vector 122 predicted from the vectors of the previous field 118 and the field 119 of two fields before. This is because the vector 122 has a smaller average error than the motion vector 120 of the current field.

As mentioned above, the subject embodiment is designed to check a magnitude of high-frequency components of a motion vector to be detected and switch the predicted vector between that from the vectors of the previous field and that from the vectors of two fields before, depending on the magnitude of high frequency components. Hence, the embodiment makes it possible to predict a motion vector more accurately than the prior art.

Figure 9:
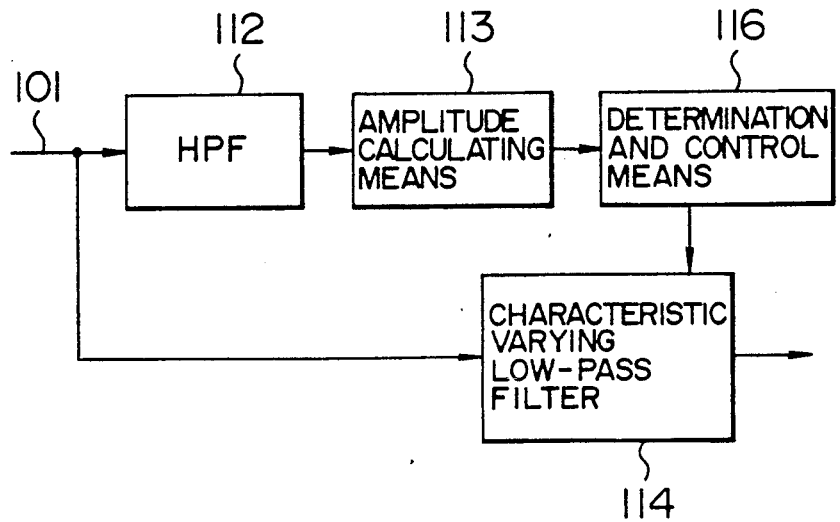
FIG. 9 is a block diagram showing a variation of the motion vector predicting device employed in the first embodiment of the invention.

Here, the difference-predicting means 115 is provided to calculate a predicted vector from the detected vectors of the previous field and those of two fields before. The detected vector of the previous field is effectively used as the predicted vector. Further, the above description indicates that the determination and control means 116 operates to switch between the output of the difference-predicting means 115 and the output of the low-pass filter 114. Yet, it may be possible to employ a method of mixing these two output signals and changing their mixing ratio depending on the magnitude of high-frequency components. As shown in FIG. 9, the low-pass filter 114 provides a variable characteristic so that the characteristic may be varied according to the magnitude of high-frequency components.

The foregoing description has indicated that the magnitude of only a high-frequency component is checked. Yet, it should be noted that a ratio of it to the magnitude of another component may be checked.

Further, the above description has indicated an automatic process of checking the magnitude of high-frequency components and switching the signals depending on the checked result. However, it is easy to allow a user to switch them depending on the condition.

Figure 10:
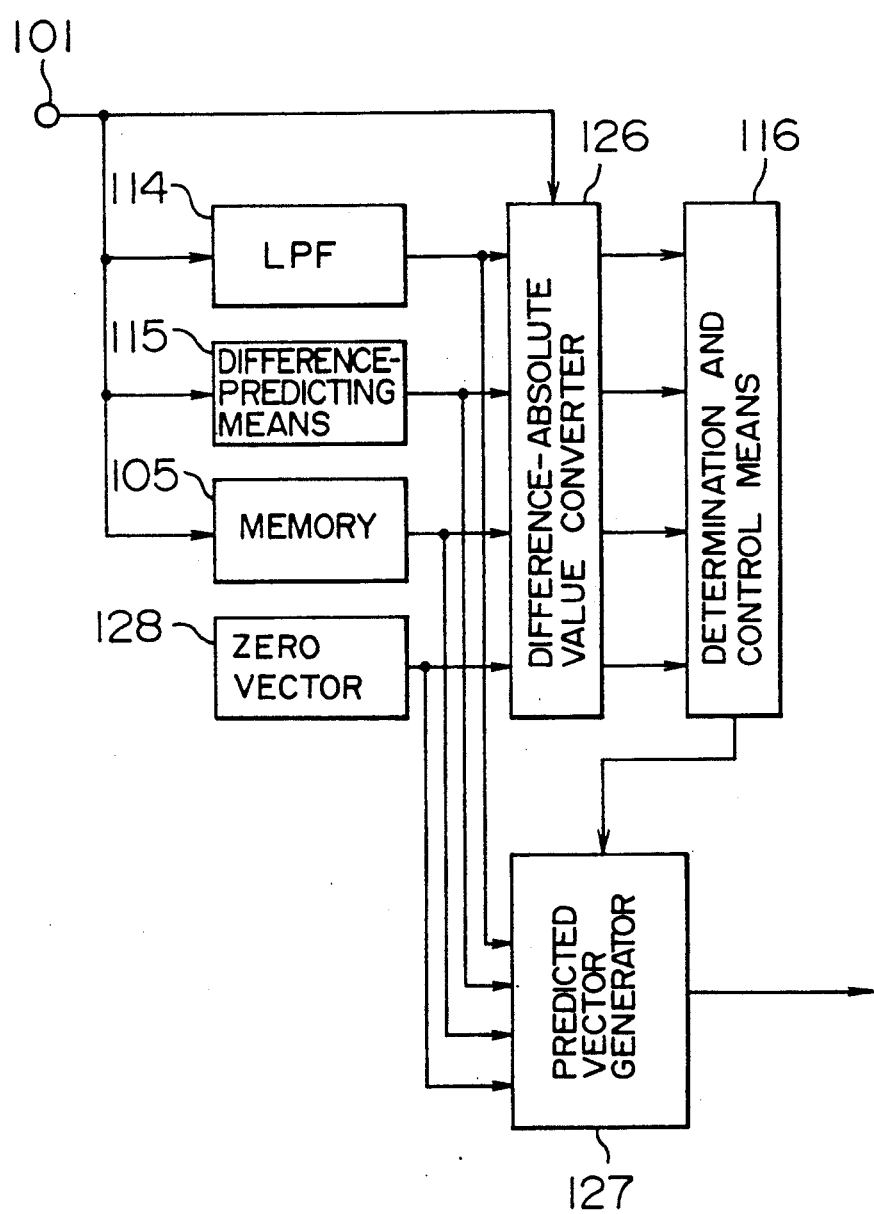
FIG. 10 is a block diagram showing a motion vector predicting device employed in the second embodiment of the invention.

FIG. 10 is a block diagram showing a vector-predicting means employed in the present invention. In FIG. 10, 101 denotes an input terminal for a vector signal, 114 denotes a low-pass filter, 115 denotes a difference-predicting means, 126 denotes a difference-absolute value converter, 116 denotes determination and control means, 127 denotes a predicted motion vector generator, 105 denotes a memory, and 128 denotes a zero vector.

Then, a description will be directed to the function of means for predicting an image-motion vector according to the subject embodiment. At first, a motion vector detected for each field is inputted to an input terminal 101. The low-pass filter 114 serves to suppress a high-frequency component of a field frequency or a vector inputted for each field. The high-frequency component occupies about a quarter or more of the field frequency. The difference-predicting means 115 calculates and outputs a predicted vector $(2 \times a \times X(n-1) - b \times X(n-2), 2 \times a \times Y(n-1) + b \times Y(n-2))$ by using the latest vector $(X(n-1), Y(n-1))$ and the previous vector $(X(n-2), Y(n-2))$ of the vectors inputted for each field (a and b denote coefficients).

The memory 105 outputs the latest vector $(X(n-1), Y(n-1))$ of the vectors inputted for each field. The difference-absolute value converter 126 stores the outputs from the low-pass filter 114, the difference-predicting means 115, and the memory 105, makes an absolute value of each difference between these outputs and the zero vector 128 and the motion vector $(X(n), Y(n))$ inputted next time, and outputs respective absolute values to the determination and control means 116. The determination and control means 116 serves to store these values for a given time, determine that the smallest value is the most reliable, and outputs the result to the predicted motion vector generator 127. Based on the determined result, the predicted motion vector generator 127 sends, as a predicted motion vector, the most reliable value determined among the zero vector 128 and the outputs from the low-pass filter 114, the difference-predicting means 115, and the memory 105.

The optimum signal processing method for predicting the motion vector of the current field on the vectors obtained before the current field depends on how the motion vector is actually changed. How to change the actual motion vector also depends on an imaging condition and an imaged object. The condition and object are changed with a longer period than the field frequency.

As noted above, the foregoing embodiment comprises the steps of processing the motion vectors of the fields before the current field through the low-pass filter 114, the difference-predicting means 115, the memory 105, and the zero vetor 128, taking a difference between the outputs of those signal-processing steps and the motion vector of the current field, checking a magnitude of an error during an constant time to thereby determine reliability of respective processing steps, and sending a most reliable output as a predicted motion vector. The embodiment thus makes it possible to more precisely match various imaging conditions or imaged objects and to more accurately predict a motion vector than the prior art.

According to the design of this embodiment, the difference-absolute value converting means 126 outputs an absolute value of a difference between each output of those signal-processing elements and the motion vector of the current field. However, it should be noted that it may output a square of the difference or a non-linearly processed absolute value of the difference. And, the predicted motion vector generator 127 sends the most reliable output of each signal-processing element based on the result of reliability determination However, depending on the result of reliability determination, it may weight the output of each element and send out the average value of the weighted outputs.

Figure 11:
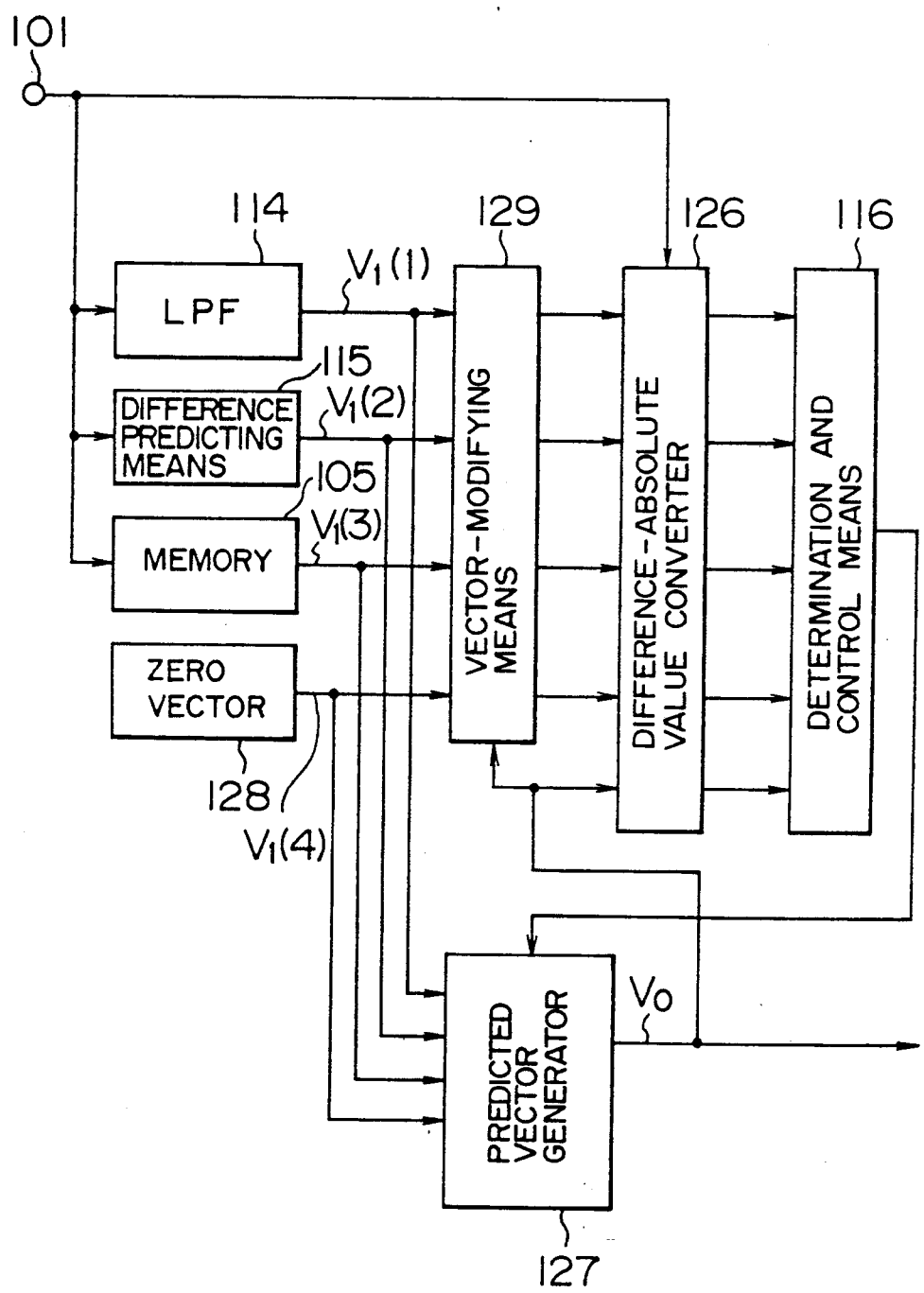
FIG. 11 is a block diagram showing a motion vector predicting device employed in the third embodiment of the invention.

FIG. 11 is a block diagram showing a motion vector predicting means employed in the present invention. In FIG. 11, 101 denotes an input terminal, 114 denotes a low-pass filter, 115 denotes a difference-predicting means, 126 denotes a difference-absolute value converting means, 116 denotes determination and control means, 127 denotes a predicted motion vector generator, 105 denotes a memory, 128 denotes a zero vector, and 129 denotes a vector-modifying means.

Then, a description will be directed to the function of the image-motion vector predicting means having the foregoing components. A motion vector detected for each field is inputted to the input terminal 101. The low-pass filter 114 filters high-frequency components of a field frequency of a vector inputted for each field, and sends out the filtered result. The high-frequency components occupy about a quarter or more of the field frequency. The difference-predicting means 115 calculates a predicted vector $(2 \times a \times X(n-1) - b \times X(n-2), 2 \times a \times Y(n-1) + b \times Y(n-2))$ (a and b denote coefficients) by using the latest vector (X(n−1), Y(n−1)) and the vector before it (X(n−2), Y(n−2)) selected among the vectors inputted for each field. Then, the means 115 outputs it.

The memory 105 outputs the latest vector (X(n−1), Y(n−1)) of the vectors inputted for each field. The vector-modifying means 129 operates to modify an output V0 of the predicted motion vector generator 127 toward values V2(1) to V2(4) by using the following equation and a coefficient C smaller than unity:

$$V2(k) = (1-C) \times V0 + C \times V1(k)$$

$$(k = 1, 2, 3, 4)$$

wherein V1(1) denotes an output of the low-pass filter 114, V1(2) denotes an output of a difference-predicting means 115, V1(3) denotes an output of the memory 105, and VJ(4) denotes an output of the zero vector 128.

The difference-absolute value converting means 126 stores each output of the vector-modifying means 129 and the output of the vector generator 127 and sends to the determination and control means 116 an absolute value of a difference between each output and the motion vector (X(n), Y(n)) inputted next time. The determination and control means 116 stores those absolute values for a predetermined time and determines that the smallest value is a most reliable one. Then, it sends out the result to the predicted motion vector generator 127. The predicted motion vector generator 127 sends weighted values of the zero vector 128 and the outputs of the low-pass filter 114, the difference-predicting means 115, and the memory 105 as a predicted motion vector. If the output of the predicted motion vector generator 127 is the most reliable, weighting is not changed. Further, if it is determined that any one of the values modified toward respective outputs V1 of these signal-processing routes is the most reliable one, the vector-modifying means 129 operates to increase the weight of the associated signal-processing route.

An mentioned above, the present embodiment comprises the steps of processing the vectors obtained before the current field through the plurality of signal-processing routes, weighting and averaging the outputs from those routes, sending out the result as a predicted motion vector, taking a difference between the predicted motion vector and the motion vector of the current field, modifying the predicted motion vector toward the outputs of the signal-processing routes, obtaining a difference between each of the modified values and the motion vector of the current field, checking respective differences in respect of the magnitude of an error for a predetermined time and determining reliability on the basis of the differences, and modifying weighting to be suited to each condition. Hence, it can automatically make optimum weighting according to various imaging conditions and imaged objects and smoothly match the change of conditions. This embodiment makes it possible to more precisely and smoothly match various conditions and to more accurately predict a motion vector than the aforementioned embodiments.

In this embodiment, the result of reliability determination indicates predicted reliability determined by the image-motion vector predicting means at that time. It is preferable to output this value, too, because it may be convenient for the application of the image-motion vector predicting means.

According to the design of this embodiment, the difference-absolute value converting means 126 outputs an absolute value of a difference between each output of those signal-processing routes and the motion vector of the current field. However, it may output a square of the differences or a non-linearly processed absolute value of the differences.

Figure 12:
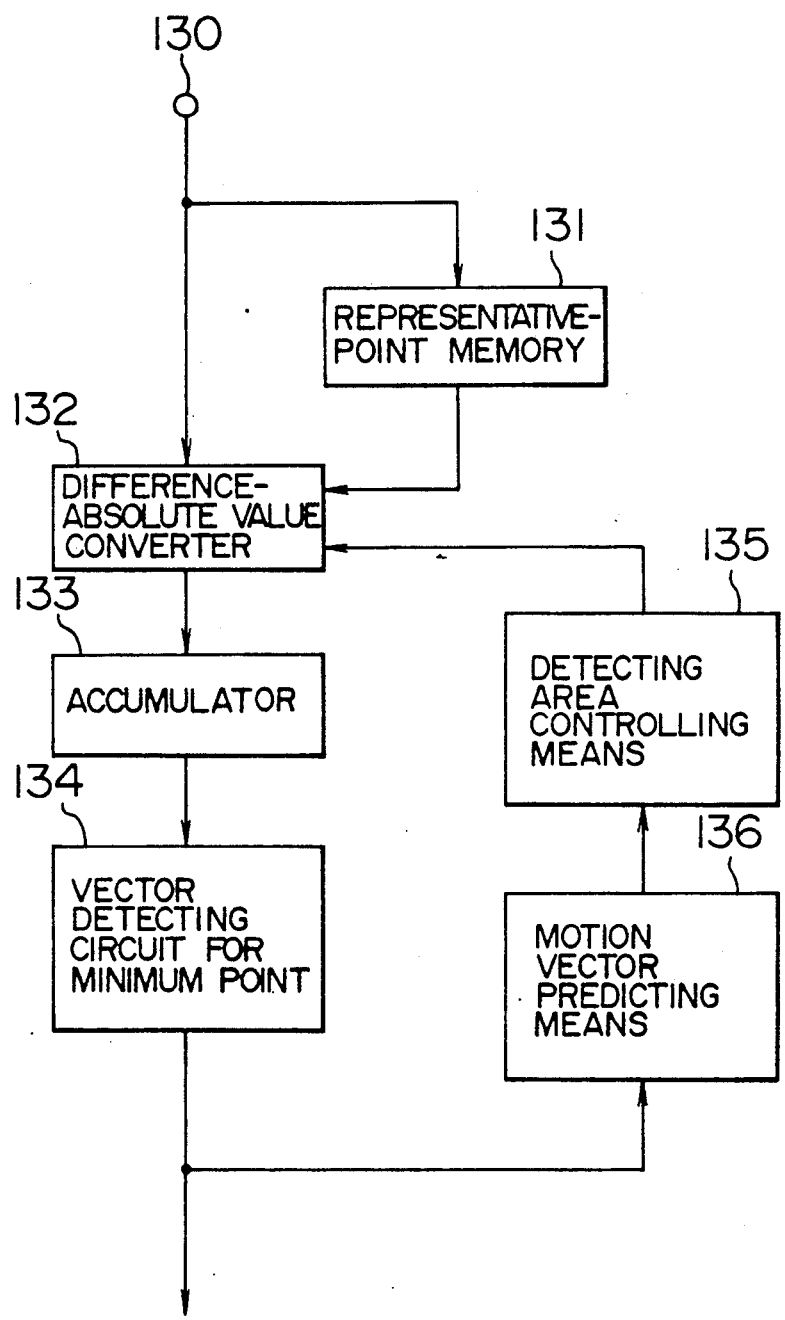
FIG. 12 is a block diagram showing the detector for detecting an image-motion vector employing the motion vector predicting device of the embodiments of the invention.

FIG. 12 is a block diagram showing an image-motion vector detector employing the foregoing predicting means. In FIG. 12, 130 denotes an input terminal for an image signal, 131 denotes a representative-point memory, which operates to store a signal for each pixel positioned on the representative points in the image signal inputted, 132 denotes a difference-absolute value converter which outputs an absolute value of a difference between both inputs, 133 denotes an accumulator, 134 denotes a minimum point detecting circuit, 135 denotes a detecting range control means, and 136 denotes a motion vector predicting means.

Next, a description will be directed to the function of the image-motion vector predicting means of the present embodiment having the foregoing components. An image signal continuing with time is inputted to the input terminal 130. In the representative-point memory 131, more than one representative point is preset beforehand in a detecting area on a screen. The memory 2 stores a signal for each pixel positioned on the representative points in the received image signal. When a field (n−1) is inputted, a motion vector (X(n−1), Y(n−1)) of the field before the field (n−1) is detected, and this vector value is inputted to the motion vector predicting means 136. The motion vector predicting means 136 is designed as shown in FIG. 6. Like the operation of the foregoing first motion vector predicting means, the means 136 predicts a motion vector of a next field (n) and inputs the predicted value (X', Y') to the detecting range control means 135. When a signal of the next field (n) is inputted, the difference-absolute value converter 132 serves to derive an absolute value $|\Delta L|$ (i, j) of a difference between a signal for each position of the representative points of the previous field and a signal for each position displaced from the representative points of the current field by (horizontally $i + X(n-1)$, vertically $j + Y(n-1)$) by being controlled by the detecting area control means 135. The range of i and j is substantially centered at zero ($-hi/2 < i \leq hi/2$, $-hj/2 < j \leq hj/2$). The accumulator 133 contains a table for the displacement (i, j), in which table the signal sent from the difference-absolute value converter 3 is accumulatively added in each element of the displacement (i, j). The resultant value is assumed as a correlative value $\Sigma|\Delta L|$ (i, j) of the displacement (i, j). The minimum-point detecting circuit 134 detects the displacement (i', j') providing a minimum value of the correlative values and calculates an addition of the detected displacement (i', j') and the detected vector (X(n−1), Y(n−1)) as a motion vector (X(n), Y(n)) of the current field with respect to the previous field.

Figure 13A:
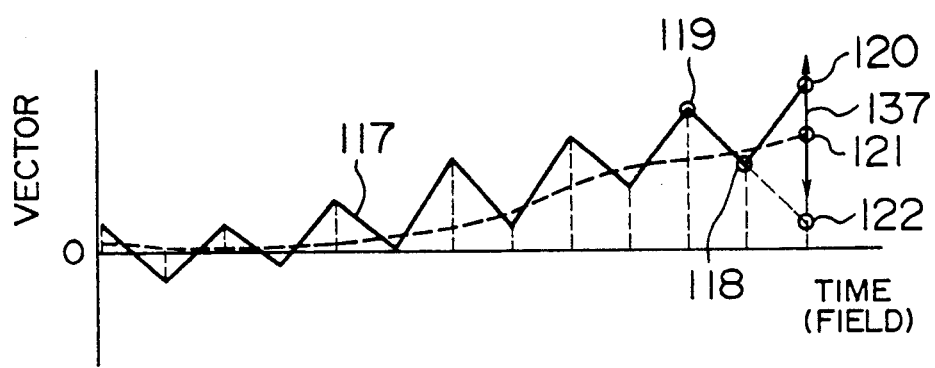
FIGS. 13a and 13b are graphs indicating the relation between an area in which a motion vector is detected and an image-motion vector in the invention.
Figure 13B:
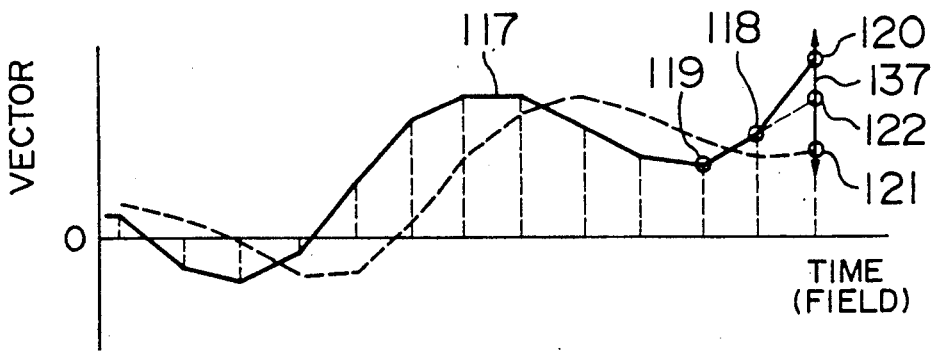

FIG. 13a shows an image-motion vector provided when an image is vibrated at a high frequency. This is caused when a user takes a video image from a fixed view point on a vehicle vibrating with a high-frequency. FIG. 13b shows an image-motion vector provided when a user holds a video camera with his hands. As shown, 117 denotes a motion vector changing with time, 118 denotes a detected vector of the previous field, 119 denotes a detected vector of two fields before, 120 denotes a motion vector of the current field, 121 denotes a motion vector filtered by the low-pass filter 114, 122 denotes an output of the difference-predicting means 115 in the current field, and 137 denotes a detecting area of a motion vector.

As discussed before (with respect to the first embodiment of the predicting means), when a large amount of high-frequency components is contained in the motion vector as shown in FIG. 13a, the output 121 of the low-pass filter 114 has a smaller error. On the other hand, when a small amount of high-frequency components is contained in the motion vector as shown in FIG. 13b, the vector 122 predicted from the vectors of the previous field 118 and the field 119 of two field before has a smaller error. Since, however, the motion vector predicting means 136 selects to produce an output of a smaller error in compliance with the condition, the detecting area 137 of the motion vector may be small in any one of FIGS. 13a and 13b. Hence, if the motion vector detecting means provides an area (hi, hj) for deriving correlative values between two images, it can detect a motion vector having a larger amplitude, resulting in a great reduction in the processing time and the circuit scale.

The motion vector predicting means 136 is designed to have the same structure and function as the motion vector predicting means of the first embodiment shown in FIG. 6. It may be designed to have the same structure and function as those of the second and the third embodiments. And, if it is designed to have the same structure and function as those of the third embodiment, as mentioned with respect to the motion vector predicting means of the third embodiment, it obtains a difference between the predicted motion vector obtained by the motion vector predicting means 136 and the motion vector of the current field and checks the magnitude of an error for a predetermined time. Then, the result is outputted to the detecting range control means 135 together with the predicted motion vector. The means 135 controls an area (hi, hj) for deriving correlative values by considering the result of checking the magnitude of an error, thereby exactly detecting a motion vector.

Each block and the overall structure of each of those predicting means of the first, second and third embodiments can be realized with hardware employing actual circuits or with software run in the microcomputer.

The predicting means of the present invention makes it possible to accurately predict a vector in a manner to match the condition under which an object image is placed. The vector detecting means employing the predicting means makes it possible to reliably and widely detect a motion vector with less operation, circuit, and processing time in any condition. Hence, in actual, it can offer very practical effects.

As discussed above, the invention is capable of detecting the motion vector in a wider area with less operation, circuit, and processing time than the prior art. Besides, the present invention can be easily realized and offer very practical effects.

We claim:

1. An image-motion vector detector for detecting a vector indicating the motion of an image, comprising:
   means for deriving correlative values of image data between an input TV signal of a current field and that of a previous field in a correlative value determination area for detecting a motion vector and to detect an optimum point of said correlative values as an image-motion vector;
   means for predicting an area for a motion vector of a current field based on motion vectors obtained before the current field; and
   means for changing said correlative value determination area for detecting a motion vector based on an output of said predicting means,
   wherein said predicting means comprises means for deriving a predicted motion vector of the current field by time-sequence signal processing of the motion vectors obtained before the current field and means for checking a frequency component of a change with time of the motion vectors obtained before the current field and controlling the time-series signal processing performed by said means for deriving said predicted motion vector based on the checking result.

2. An image-motion vector detector according to claim 1, wherein said checking and controlling means comprises means for outputting, as a predicted motion vector of the current field when a large amount of high frequency components higher than a predetermined frequency is contained in a change with time of motion vectors obtained before the current field, a vector value obtained by removing the high frequency components and smoothing with time the motion vectors obtained before the current field, while, for outputting, as a predicted motion vector of the current field when high frequency components not exceeding the predetermined frequency are mainly contained, a vector value predicted by using mainly a detected vector of the previous field or detected vectors of the previous field and two fields before.

3. An image-motion vector detector for detecting a vector indicating the motion of an image, comprising:
   means for deriving correlative values of image data between an input TV signal of a current field and that of a previous field in a correlative value determination area for detecting a motion vector and to detect an optimum point of said correlative values as an image-motion vector;
   means for predicting an area for a motion vector of a current field based on motion vectors obtained before the current field; and
   means for changing said correlative value determination area for detecting a motion vector based on an output of said predicting means,
   wherein said predicting means comprises means for processing the motion vectors obtained before the current field through two or more different time-series signal processings and deriving prediction candidate vectors of the current field respectively, means for obtaining a predicted motion vector by selecting from among the candidate vectors or by weighting the respective candidate vectors and averaging the weighted results, and means for checking a difference of each candidate vector or both of each candidate vector and a predicted motion vector from a motion vector obtained actually at a later time, storing the difference data over several fields, and controlling the selection or weighting by said means for obtaining a predicted motion vector on the basis of the stored difference data.

4. An image-motion vector detector for detecting a vector indicating the motion of an image, comprising:
   means for deriving correlative values of image data between an input TV signal of a current field and that of a previous field in a correlative value determination area for detecting a motion vector and to detect an optimum point of said correlative values as an image-motion vector;

means for predicting an area for a motion vector of a current field based on motion vectors obtained before the current field; and means for changing said correlative value determination area for detecting a motion vector based on an output of said predicting means, wherein said predicting means comprises means for performing two or more different time-series signal processings on the motion vectors obtained before the current field and producing respective processing outputs, means for detecting a difference between each of the processing outputs and a motion vector obtained in the current field, means for storing the detected differences on the time-series basis and determining reliability of each processing output, and means for outputting, as a predicted motion vector, a most reliable value in the results of reliability determination or a value obtained by weighting and averaging each processing output based on the results of reliability determination.

5. An image-motion vector detector for detecting a vector indicating the motion of an image, comprising:

means for deriving correlative values of image data between an input TV signal of a current field and that of a previous field in a correlative value determination area for detecting a motion vector and to detect an optimum point of said correlative values as an image-motion vector;

means for predicting an area for a motion vector of a current field based on motion vectors obtained before the current field; and means for changing said correlative value determination area for detecting a motion vector based on an output of said predicting means, wherein said predicting means comprises means for performing two or more different time-series signal processings on the motion vectors obtained before the current field and producing respective processing outputs, means for outputting, as a predicted motion vector, a value obtained by weighting and averaging each processing output, means for outputting a vector value obtained by modifying the predicted motion vector in the direction of each processing output respectively, means for detecting a difference between each modified vector along with the predicted motion vector and a motion vector obtained in the current field, and means for storing the detected differences on the time-series basis and determining reliability of said each processing output, and means for deciding a most reliable processing output in the results of reliability determination and determining or modifying degrees of respective weighting performed by said predicted motion vector outputting means on the basis of the result of the decision.

6. A detector for detecting an image-motion vector indicating the motion of an image, comprising:

correlative value determining means for obtaining correlative values of image data between an input TV signal of a current field and that of a previous field;

motion vector detecting means for detecting an optimum point of said correlative values obtained from said image data, wherein said optimum point corresponds to said image-motion vector; and motion vector predicting means for predicting an image-motion vector to be obtained for the current field based on image-motion vectors obtained from previous fields before the current field and providing an output representing said predicted image-motion vector, wherein said correlative value determining means comprises means for changing a correlative value determining area responsive to said output of said predicting means to obtain said correlative values of said image data based on said output of said predicting means, said correlative value calculated area constituting a motion vector detecting area.

7. An image-motion vector detector according to claim 6, wherein said correlative value calculating means comprises:

a representative point memory for storing said input TV signal of the previous field as a reference image signal with respect to a signal recording position;

difference absolute value determining means for determining a difference absolute value between said reference image signal of said representative point memory and the input TV signal of the current field and providing an output representing said difference absolute value;

an accumulator for cumulatively adding said output of said difference absolute value determining means at a same relative position with reference to said signal recording position of said representative point memory; and minimum point detecting means for selecting a smallest value from said output of said difference absolute value determining means from said accumulator, wherein said signal recording position of said representative point memory, at which the input TV signal of the previous field is recorded as said reference image signal, is fixed preliminarily, said correlative value determining area, at which the correlative value determination is performed with reference to said signal recording position, is shifted, and a direction and an amount of shift from said signal recording position of said representative point memory to a center of said correlative value determining area is predicted by said predicting means based on image-motion vectors obtained in the previous fields before the current field.

8. An image-motion vector detector according to claim 6, wherein said correlative value calculating means comprises:

a representative point memory for storing said input TV signal of the previous field as a reference image signal with respect to a signal recording position;

difference absolute value determining means for determining a difference absolute value between said reference image signal of said representative point memory and the input TV signal of the current field and providing an output representing said difference absolute value;

an accumulator for cumulatively adding said output of said difference absolute value determining means at a same relative position with reference to said signal recording position of said representative point memory; and minimum point detecting means for selecting a smallest value from said output of said difference absolute value determining means from said accumulator, wherein said signal recording position of said representative point memory, at which the input TV signal of the previous field is recorded as said reference image signal, is shifted, said correlative value determining area, at which the correlative value determination is performed with reference to said signal recording position, is fixed at a predetermined position, and a direction and an amount of shift from a center of said correlative value determining area to said signal recording position of said representative point memory is opposite to a direction and of a same amount as those predicted by said predicting means based on image-motion vectors obtained in the previous fields before the current field.

9. An image-motion vector detector according to claim 6, wherein said predicting means comprises means for deriving a predicted motion vector of the current field by time-sequence signal processing of the motion vectors obtained before the current field and means for checking a frequency component of a change with time of the motion vectors obtained before the current field and controlling the time-series signal processing performed by said means for deriving said predicted motion vector based on the checking result.

10. An image-motion vector detector according to claim 7, wherein said predicting means comprises means for deriving a predicted motion vector of the current field by time-sequence signal processing of the motion vectors obtained before the current field and means for checking a frequency component of a change with time of the motion vectors obtained before the current field and controlling the time-series signal processing performed by said means for deriving said predicted motion vector based on the checking result.

11. An image-motion vector detector according to claim 8, wherein said predicting means comprises means for deriving a predicted motion vector of the current field by time-sequence signal processing of the motion vectors obtained before the current field and means for checking a frequency component of a change with time of the motion vectors obtained before the current field and controlling the time-series signal processing performed by said means for deriving said predicted motion vector based on the checking result.

12. An image-motion vector detector according to claim 6, wherein said predicting means comprises means for processing the motion vectors obtained before the current field through two or more different time-series signal processings and deriving prediction candidate vectors of the current field respectively, means for obtaining a predicted motion vector by selecting from among the candidate vectors or by weighting the respective candidate vectors and averaging the weighted results, and means for checking a difference of each candidate vector or both of each candidate vector and a predicted motion vector from a motion vector obtained actually at a later time, storing the difference data over several fields, and controlling the selection or weighing by said means for obtaining a predicted motion vector on the basis of the stored difference data.

13. An image-motion vector detector according to claim 7, wherein said predicting means comprises means for processing the motion vectors obtained before the current field through two or more different time-series signal processings and deriving prediction candidate vectors of the current field respectively, means for obtaining a predicted motion vector by selecting from among the candidate vectors or by weighing the respective candidate vectors and averaging the weighted results, and means for checking a difference of each candidate vector or both of each candidate vector and a predicted motion vector from a motion vector obtained actually at a later time, storing the difference data over several fields, and controlling the selection or weighing by said means for obtaining a predicted motion vector on the basis of the stored difference data.

14. An image-motion vector detector according to claim 8, wherein said predicting means comprises means for processing the motion vectors obtained before the current field through two or more different time-series signal processings and deriving prediction candidate vectors of the current field respectively, means for obtaining a predicted motion vector by selecting from among the candidate vectors or by weighing the respective candidate vectors and averaging the weighted results, and means for checking a difference of each candidate vector or both of each candidate vector and a predicted motion vector from a motion vector obtained actually at a later time, storing the difference data over several fields, and controlling the selection or weighing by said means for obtaining a predicted motion vector on the basis of the stored difference data.

* * * * *